United States Patent
Vijayadevaraj et al.

(10) Patent No.: US 9,568,124 B2
(45) Date of Patent: Feb. 14, 2017

(54) QUICK CONNECT COUPLING WITH SWAGED VALVE COMPONENTS AND METHOD FOR ASSEMBLING

(71) Applicant: EATON CORPORATION, Cleveland, OH (US)

(72) Inventors: Chetan Bangalore Vijayadevaraj, Karnataka (IN); Pradeep Kumar, Uttar Pradesh (IN); Onkar Bhise, Maharashtra (IN); Jason Dahms, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 9 days.

(21) Appl. No.: 14/417,213

(22) PCT Filed: Mar. 13, 2013

(86) PCT No.: PCT/US2013/030974
§ 371 (c)(1),
(2) Date: Jan. 26, 2015

(87) PCT Pub. No.: WO2014/018106
PCT Pub. Date: Jan. 30, 2014

(65) Prior Publication Data
US 2015/0247594 A1    Sep. 3, 2015

(30) Foreign Application Priority Data

Jul. 26, 2012    (IN) .............................. 839/KOL/2012

(51) Int. Cl.
*F16L 13/14*        (2006.01)
*F16L 37/35*        (2006.01)
*F16L 37/23*        (2006.01)

(52) U.S. Cl.
CPC ............ *F16L 13/142* (2013.01); *F16L 13/147* (2013.01); *F16L 37/23* (2013.01); *F16L 37/35* (2013.01);
(Continued)

(58) Field of Classification Search
CPC .......... F16L 37/23; F16L 37/35; F16L 13/142; F16L 13/147; F16L 37/30; F16L 37/32; F16L 37/34; F16L 37/36; Y10T 137/87949; Y10T 137/87957; Y10T 137/87941; Y10T 29/49913
(Continued)

(56) References Cited

U.S. PATENT DOCUMENTS

| 175,232 A * | 3/1876 | Work ................... F16L 27/0816 285/148.15 |
| 379,749 A * | 3/1888 | Wilson ................... F16L 41/082 285/222 |

(Continued)

FOREIGN PATENT DOCUMENTS

| EP | 1 083 375 A2 | 3/2001 |
| GB | 1 592 614 A | 7/1981 |
| SE | WO 2010047633 A1 * | 4/2010 .............. F16L 37/35 |

OTHER PUBLICATIONS

International Search Report for corresponding International Patent Application No. PCT/US2013/030974 mailed Jul. 15, 2013.
Eaton® FD17 Series, "Quick Disconnect Coupling", 2013, 2 pages.

*Primary Examiner* — Kevin Murphy
*Assistant Examiner* — David Colon Morales
(74) *Attorney, Agent, or Firm* — Merchant & Gould P.C.

(57) ABSTRACT

The present disclosure relate to coupling components including valve structures and methods for forming the valve structures. The method includes attaching together a male valve piece (52) and a female valve piece (54) to form a valve structure that extends along a longitudinal axis. The (Continued)

method includes inserting the male (52) and female (54) valve pieces axially together. The method also includes using a swaging tool (200) to inelastically deform at least one of the male and female valve pieces from an insertion configuration to a locking configuration in which relative axial movement between the male and female valve pieces is prevented.

24 Claims, 17 Drawing Sheets

(52) U.S. Cl.
CPC ... *Y10T 29/49913* (2015.01); *Y10T 137/87957* (2015.04)

(58) Field of Classification Search
USPC .................. 251/149, 149.1, 149.6, 149.7
See application file for complete search history.

(56) References Cited

U.S. PATENT DOCUMENTS

| | | | | |
|---|---|---|---|---|
| 1,299,371 A | * | 4/1919 | Meloon | F16L 47/24 285/148.13 |
| 1,610,165 A | * | 12/1926 | Schellin | F16L 15/003 285/280 |
| 3,613,726 A | * | 10/1971 | Torres | F16L 37/23 137/614.03 |
| 3,731,705 A | * | 5/1973 | Butler | F16L 37/23 137/614.06 |
| 3,995,659 A | * | 12/1976 | Cantore | F16L 37/23 137/614.03 |
| 4,598,896 A | * | 7/1986 | Maldavs | F16L 37/23 137/454.2 |
| 4,700,743 A | * | 10/1987 | L'Henaff | F16L 37/32 137/560 |
| 4,733,692 A | * | 3/1988 | Kotake | F16L 37/23 137/614.03 |
| 4,768,551 A | | 9/1988 | Allread et al. | |
| 4,799,512 A | * | 1/1989 | Sarson | F16L 37/22 137/614.04 |
| 4,817,668 A | * | 4/1989 | Smith, III | F16L 1/26 137/614.04 |
| 4,949,745 A | * | 8/1990 | McKeon | F16L 37/23 137/15.09 |
| 5,211,197 A | * | 5/1993 | Marrison | F16L 37/23 137/614 |
| 5,478,122 A | | 12/1995 | Seabra | |
| 5,645,106 A | * | 7/1997 | Ricken | F16L 37/35 137/614 |
| 5,884,897 A | * | 3/1999 | Arosio | F16L 37/23 137/614.03 |
| 5,971,019 A | * | 10/1999 | Imai | F16L 37/23 137/614.04 |
| 6,082,399 A | * | 7/2000 | Nyberg | F16L 37/23 137/614.03 |
| 6,217,082 B1 | * | 4/2001 | Orcutt | F16L 27/08 285/258 |
| 6,382,251 B1 | * | 5/2002 | Hopson | F16L 37/23 137/614 |
| 6,557,824 B1 | * | 5/2003 | Jenski, Jr. | F16L 37/23 137/614.03 |
| 6,637,460 B2 | * | 10/2003 | Haunhorst | F16L 37/23 137/614.03 |
| 6,655,498 B1 | * | 12/2003 | Sasa | F01M 11/0408 137/614.04 |
| 6,776,187 B1 | * | 8/2004 | Marquis | F16L 37/23 137/614.03 |
| 7,213,845 B2 | * | 5/2007 | Sato | F16L 37/34 285/315 |
| 7,695,022 B2 | | 4/2010 | Wells | |

* cited by examiner

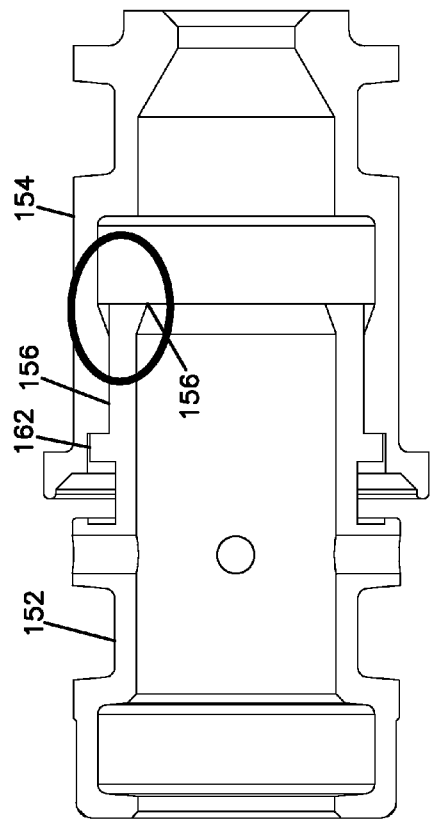
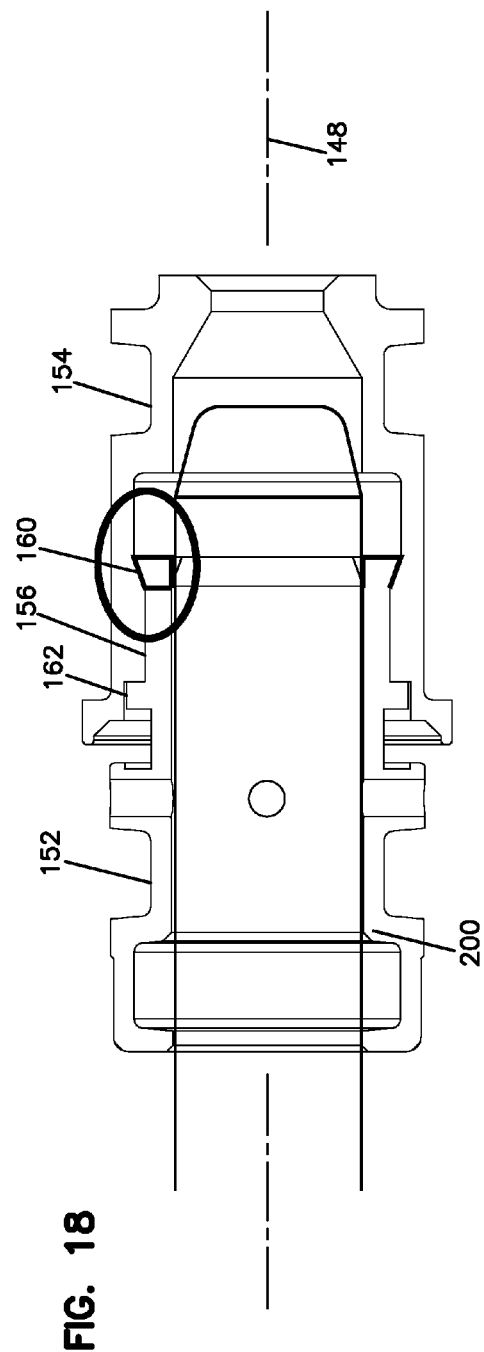
FIG. 17
FIG. 18

QUICK CONNECT COUPLING WITH SWAGED VALVE COMPONENTS AND METHOD FOR ASSEMBLING

This application is a National Stage Application of PCT/US2013/030974, filed Mar. 13, 2013, which claims benefit of Indian Patent Application Serial No. 839/KOL/2012 filed on Jul. 26, 2012 and which applications are incorporated herein by reference. To the extent appropriate, a claim of priority is made to each of the above disclosed applications.

TECHNICAL FIELD

The present disclosure relates generally to fluid couplings. More particularly, the present disclosure relates to techniques for assembling valve structures within quick connect fluid couplings.

BACKGROUND

Quick connect couplings are used to quickly and securely couple together two fluid lines (e.g., airlines, hydraulic fluid lines, etc.). A typical quick connect coupling includes a coupler socket that receives a coupler plug. The coupler socket includes an internal valve structure that closes flow through the coupler socket when the coupler socket is disconnected from the coupler plug. Similarly, a coupler plug includes an internal valve structure that closes fluid flow through the coupler plug when the coupler plug is disconnected from the coupler socket. When the coupler plug is inserted into the coupler socket, the valve structures within the coupler socket and the coupler plug open such that fluid flow is allowed through the quick connect coupling. The coupler socket typically includes a retaining mechanism that automatically secures the coupler plug within the coupler socket when the coupler plug is inserted into the coupler socket. The retaining mechanism can be manually released to withdraw the coupler plug from the coupler socket. A typical quick connect coupling includes a plurality of seals that prevent fluid leakage at the interface between the coupler socket and the coupler plug.

While existing quick connect couplings are quite effective, improvements are still needed. For example, improved techniques for facilitating assembly are needed. Also, designs that assist in eliminating leakage paths are also desirable. Moreover, arrangements that prevent valve parts from loosening with respect to one another within the quick connect coupling are also desirable.

SUMMARY

One aspect of the present disclosure relates to a quick connect coupling component including an internal valve structure manufactured from first and second valve pieces that are permanently secured together at a swaged connection interface. The swaged connection interface assists in eliminating leak paths within the quick connect coupling. The swaged connection interface can also provide an effective and efficient assembly technique for securing the first and second valve pieces together. Moreover, the swaged connection interface can provide a permanent connection between the first and second valve pieces that does not loosen or otherwise disconnect over time. In certain embodiments, the valve structure is incorporated into a high-pressure breathing-air coupling used for breathing-air systems such as SCBA (self-contained breathing apparatus), breather boxes and in-plant connections.

Another aspect of the present disclosure relates to a method for attaching together a male valve piece and a female valve piece to form a valve structure that extends along a longitudinal axis. The method includes inserting the male and female valve pieces axially together. The method also includes using a swaging tool to inelastically deform at least one of the male and female valve pieces from an insertion configuration to a locking configuration in which relative axial movement between the male and female valve pieces is prevented. In one embodiment, the male valve piece is inelastically deformed by the swaging tool, the female valve piece includes an interior retaining projection that projects radially inwardly from a main body of the female valve piece, the male valve piece includes an insertion end including first and second outer retaining projections that project radially outwardly from a main body of the male valve piece at least when the male valve piece is in the locking configuration, and the interior retaining projection is captured between the first and second retaining projections when the male valve piece is in the locking configuration. In this embodiment, the swaging tool can be a mandrel that is inserted at least partially through the male valve piece to deform the male valve piece from the insertion configuration to the locking configuration. In one embodiment, when the male valve piece is in the insertion configuration: a) the insertion end includes the first and second outer retaining projections which are separated by a tapered portion of the main body of the male valve piece; b) the tapered portion tapers inwardly toward the longitudinal axis as the tapered portion extends in an insertion direction from the second outer retaining projection toward the first outer retaining projections; c) the first outer retaining projection has a smaller outer diameter than the second outer retaining projection; and d) the outer diameter of the first projection is smaller than an inner diameter of the interior retaining projection and the outer diameter of the second retaining projection is larger than the inner diameter of the interior retaining projection. In such an embodiment, the mandrel can expand the tapered portion radially outwardly to deform the male valve piece from the insertion configuration to the locking configuration. When in the locked configuration, the outer diameter of the first outer retaining projection is larger than the inner diameter of the interior retaining projection. An axial spacing between the first and second outer retaining projections can be generally equal to an axial dimension of the interior retaining projection at least when the male valve member is in the locking configuration.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as followings:

FIG. 17 shows an alternative connection interface for connecting a first valve piece to a second valve piece prior to deforming the interface to provide a permanent connection between the first and second valve pieces; and FIG. 18 shows the connection interface of FIG. 17 after a mandrel has been passed through the first valve piece to permanently move a portion of the first valve piece from an insertion position to a retaining/locking position in which the first and second valve pieces are permanently secured together.

DETAILED DESCRIPTION

Figure 1:
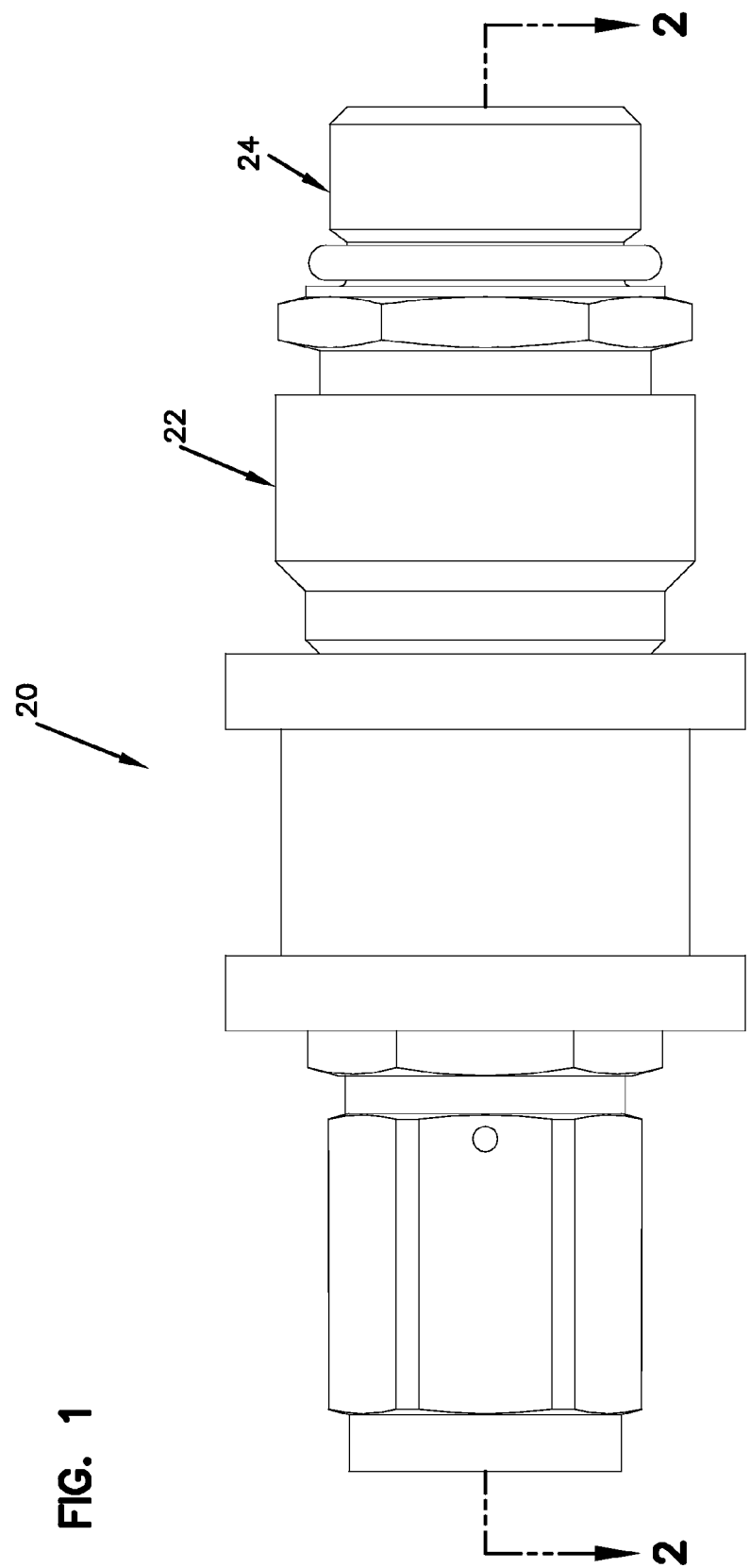
FIG. 1 is a side view of a fluid coupling in accordance with the principles of the present disclosure.
Figure 2:
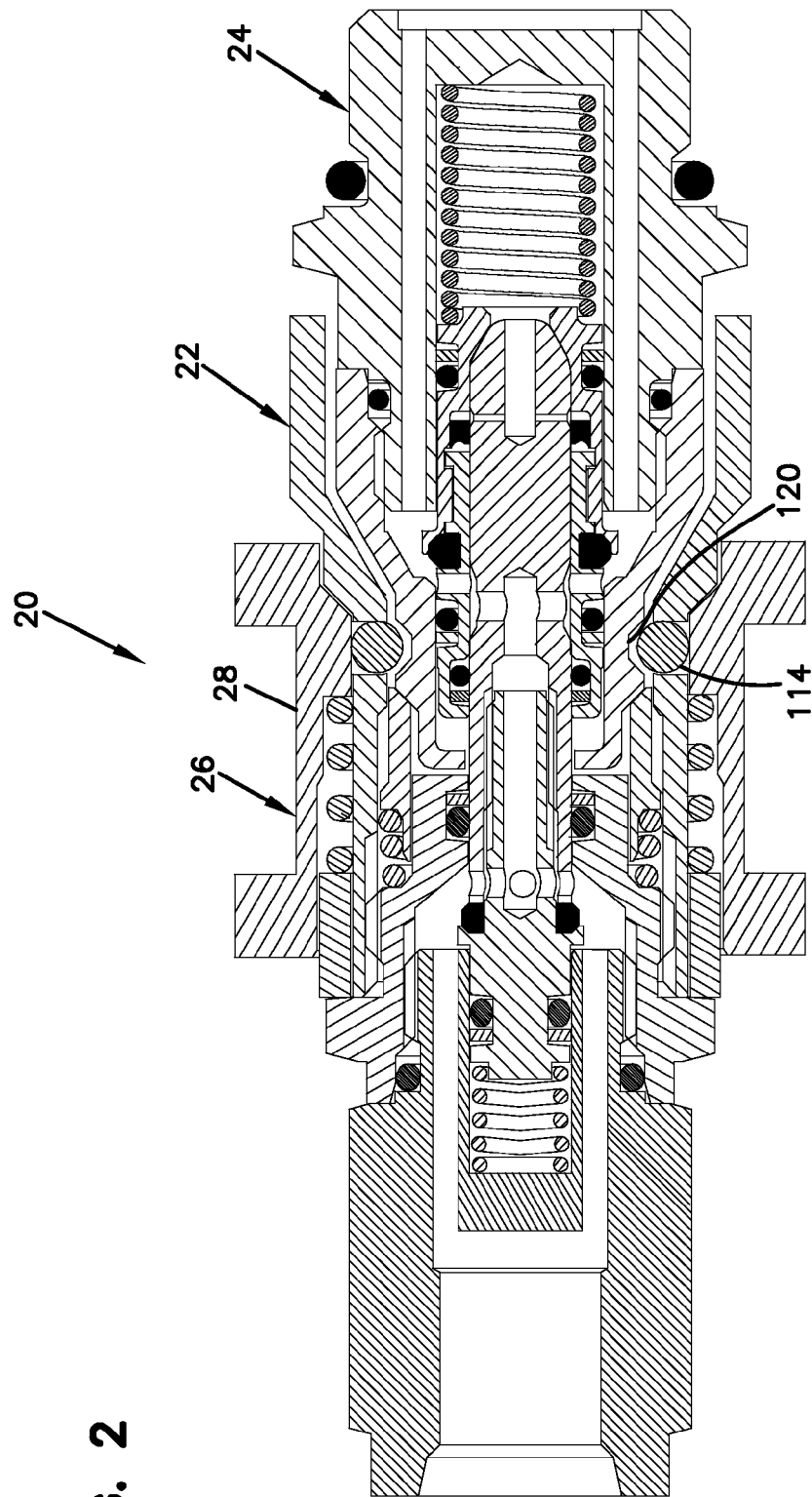
FIG. 2 is a cross-sectional view of the fluid coupling of FIG. 1 taken along Section Line 2-2, the coupling is shown in a coupled orientation.
Figure 3:
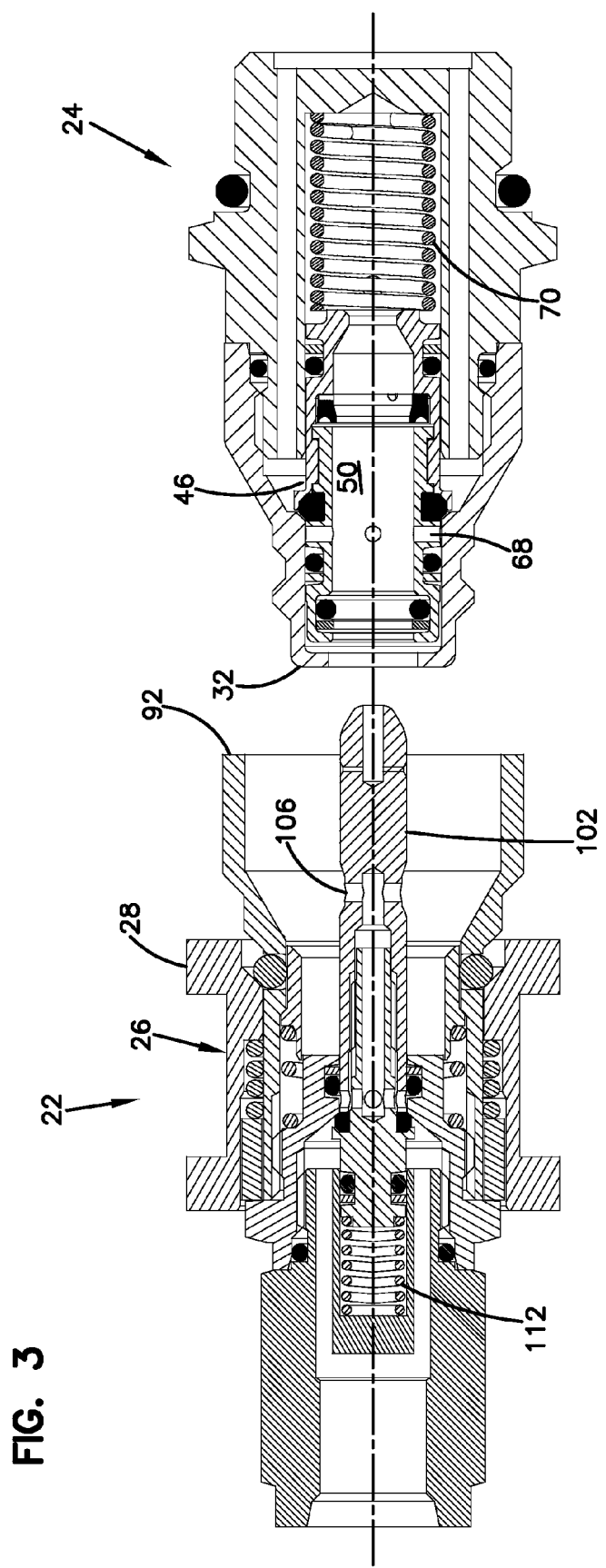
FIG. 3 is a cross-sectional view showing the fluid coupling of FIG. 2 in a decoupled orientation.

FIGS. 1-3 show a quick connect coupling 20 in accordance with the principles of the present disclosure. The quick connect coupling 20 includes a coupler socket 22 that receives a coupler plug 24. When the coupler plug 24 is disconnected from the coupler socket 22, both the coupler socket 22 and the coupler plug 24 are closed such that fluid flow is not permitted through either the coupler socket 22 or the coupler plug 24. FIG. 3 shows the coupler plug 24 and the coupler socket 22 in a decoupled orientation in which the coupler plug 24 is separate from the coupler socket 22 and valve mechanisms within the coupler socket 22 and the coupler plug 24 prevent fluid flow through the coupler socket 22 and the coupler plug 24. When the coupler plug 24 is inserted into the coupler socket 22, the valve mechanisms within the coupler socket 22 and the coupler plug 24 open such that fluid flow is permitted through the quick connect coupling 20. FIG. 2 shows the coupler socket 22 and the coupler plug 24 in a coupled orientation. As shown at FIG. 2, the coupler socket 22 includes a retention mechanism 26 that automatically retains the coupler plug 24 in the coupler socket 22 when the coupler plug 24 is inserted into the coupler socket 22. By manually retracting an outer sleeve 28 of the retention mechanism 26, the coupler plug 24 can be withdrawn from the coupler socket 22 to disconnect the quick connect coupling 20.

In a preferred embodiment, the quick connect coupling 20 is a high-pressure breathing air coupling for use in breathing air systems such as SCBA, breather boxes and in-plant connections. In certain embodiments, such systems can operate with pressures ranging from 2000-5500 pounds per square inch. In certain embodiments, the coupler plug 24 can be connected to a structure such as a breathing air tank, and the coupler socket 22 can be connected to a structure such as a breathing air hose. In other embodiments, the quick connect coupling can be used for other types of fluid systems such as hydraulic fluid systems, or other applications having a variety of different operating pressures.

Figure 4:
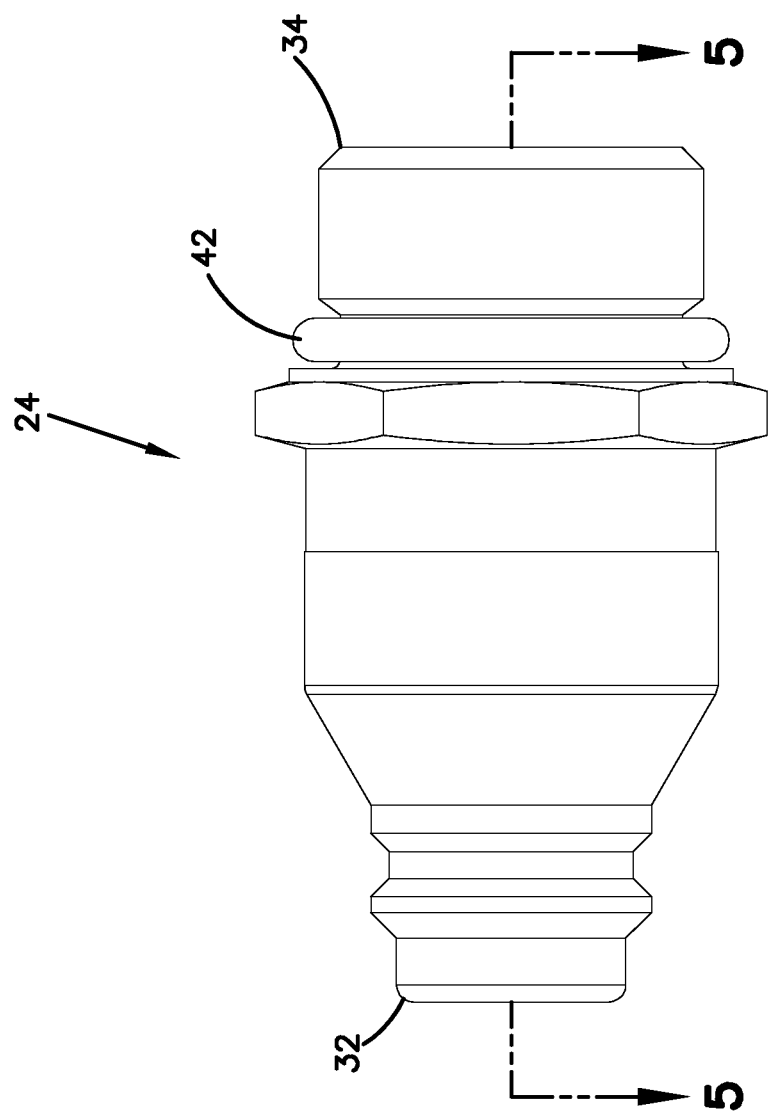
FIG. 4 is a side view of a coupler plug of the fluid coupling of FIG. 1.
Figure 5:
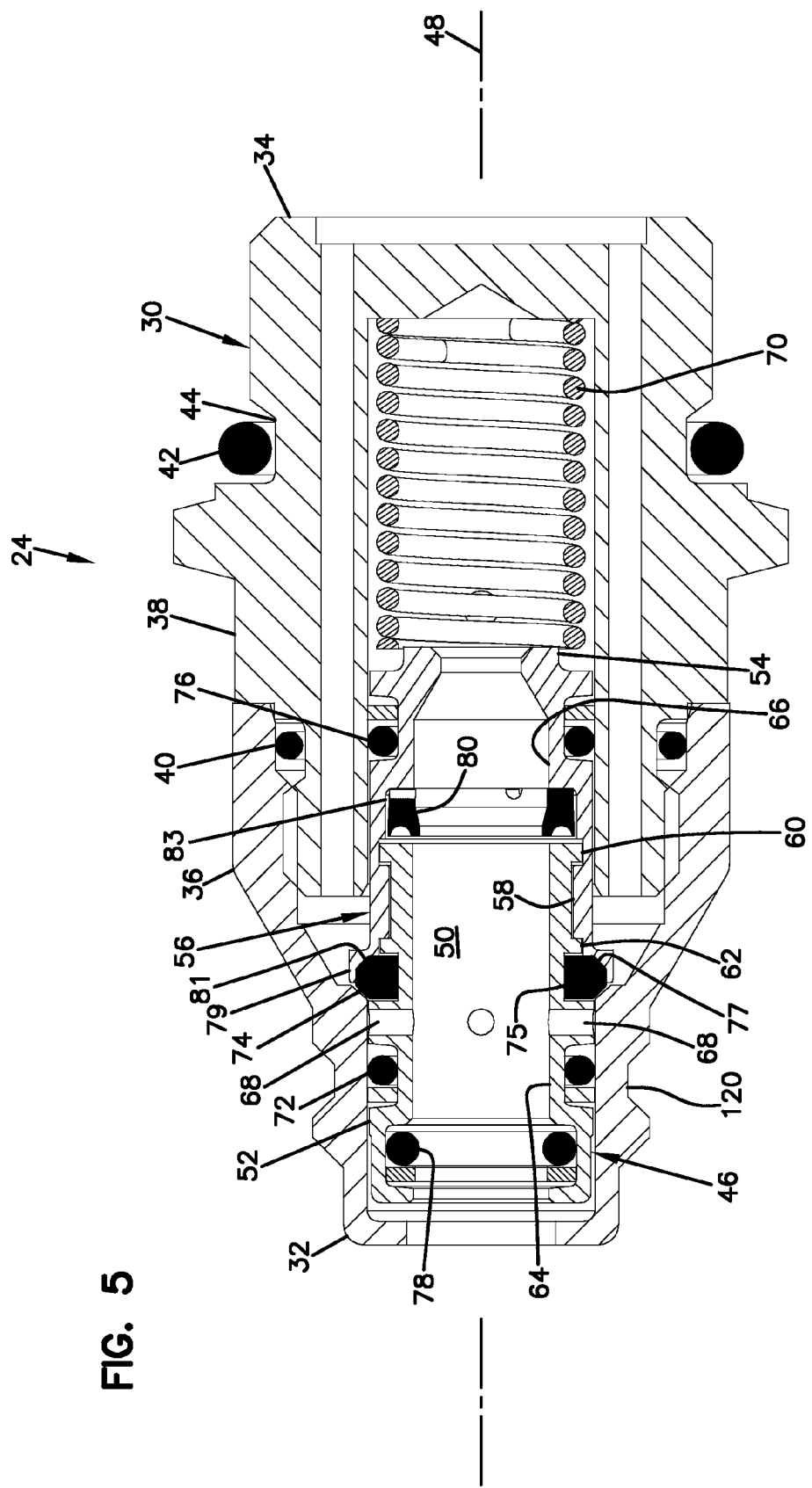
FIG. 5 is cross-sectional view taken along Section Line 5-5 of FIG. 4.

FIGS. 4 and 5 show the coupler plug 24 of the quick connect coupling 20. As best shown at FIG. 5, the coupler plug 20 includes a plug housing 30 having a first end 32 and an opposite second end 34. The first end 32 of the plug housing 30 defines a male plug portion configured to fit within the coupler socket 22. In the depicted embodiment, the plug housing 30 includes a first housing piece 36 that mounts to a second housing piece 38. The first housing piece 36 defines the first end 32 of the plug housing and the second housing piece 38 defines the second end 34 of the plug housing 30. An annular seal 40 is mounted at a mechanical interface between the first and second housing pieces 36, 38. An exterior annular seal 42 is mounted within an annual groove 44 defined by the second housing piece 38.

Referring still to FIG. 5, the coupler plug 24 also includes a plug valve structure 46 mounted within the interior of the plug housing 30. The plug valve structure 46 is aligned and elongated along a coupler plug axis 48 that extends through the coupler plug 24 between the first and second ends 32, 34 of the coupler plug 24. The plug valve structure 46 has a hollow interior so as to define a plug valve passage 50 that extends through the plug valve structure 46 along the coupler plug axis 48. The plug valve structure includes a first valve piece 52 secured within a second valve piece 54 by a non-threaded mechanical interface 56. The first and second valve pieces 52, 54 preferably have a metal construction. The non-threaded mechanical interface 56 is provided by an inward radial projection 58 of the second valve piece 54 that is captured between first and second outward radial projections of the first valve piece 52 such that relative movement between the first and second valve pieces 52, 54 along the coupler plug axis 48 is prevented. In the depicted embodiment, the first and second outward radial projections 60, 62 are unitary with a main body 64 of the first valve piece 52. The first and second outward radial projections 60, 62 can form exterior rings of the first valve piece 52 that extend around the coupler plug axis 48. In certain embodiments, the exterior rings extend continuously, without interruption about the coupler plug axis 48. The inward radial projection 58 of the second valve piece 54 is unitary with a main body 66 of the second valve piece 54. The inward radial projection 58 can form an interior ring of the second valve piece 54 that extends around the coupler plug axis 48. In certain embodiments, the interior ring can extend continuously, without interruption about the coupler plug axis 48.

In certain embodiments, the exterior rings of the first valve piece 52 and the interior ring of the second valve piece 54 can have rectangular cross-sectional shapes when viewed in cross-section with the cross-section being cut along a cross-sectional plane that includes the coupler plug axis 48.

In other embodiments, the exterior rings can have different shapes (e.g., rounded) when viewed in cross-section.

Referring still to FIG. 5, the first valve piece 52 defines a plurality of radial plug valve openings 68 that extend through the main body 64 of the first valve piece 52 and provide fluid communication between the plug valve passage 50 and an exterior of the plug valve structure 46. The plug valve structure 46 is movable relative to the plug housing 30 along the coupler plug axis 48 between an open position (See FIG. 3) and a closed position (see FIG. 5). When the plug valve structure 46 is in the closed position, the plug valve structure 46 prevents fluid flow through the plug housing 30. When the plug valve structure 46 is in the open position, the plug valve structure 46 allows fluid flow through the plug housing 30 via the radial plug valve openings 68 and the plug valve passage 50. A plug spring 70 is mounted within the second housing piece 38 and functions to bias the plug valve structure 46 toward the closed position of FIG. 5. As shown at FIG. 5, the plug spring 70 is captured between the second housing piece 38 and the second valve piece 54. Thus, the plug spring 70 biases the plug valve structure 46 toward the first end 32 of the plug housing 30.

Referring still to FIG. 5, the coupler plug 24 includes a number of seals for preventing leaks within the coupler plug 24. The radial plug valve openings 68 are positioned axially between annular seals 72, 74. The seal 74 has a trapezoidal cross-sectional shape and assists in providing a fluid-tight seal between the first and second valve pieces 52, 54 adjacent the mechanical interface 56 and for preventing fluid flow through the plug housing 30 when the plug valve structure 46 is in the closed position. The seal 74 seats within an annular groove 75 defined by the first valve piece 52 and engages a ramped sealing surface 77 defined by the second valve piece 54. An axial lip 79 of the second valve piece 54 axially overlaps the seal 74 and cooperates with the ramped sealing surface 77 to define an end pocket 81 that assists in containing the seal 74 when the seal 74 is compressed to provide a fluid tight seal. The seal 72 as well as seal 76 are annular seals that provide sealing between an exterior of the plug valve structure 46 and the plug housing 30. Interior seals 78, 80 are mounted within interior annular grooves defined within the plug valve passage 50. The seal 78 is mounted within the first valve piece and interior seal 80 is mounted within the second valve piece 54. Interior seal 80 is mounted adjacent to the mechanical interface 56 such that the mechanical interface 56 is positioned between interior seal 80 and exterior seal 74.

Figure 6:
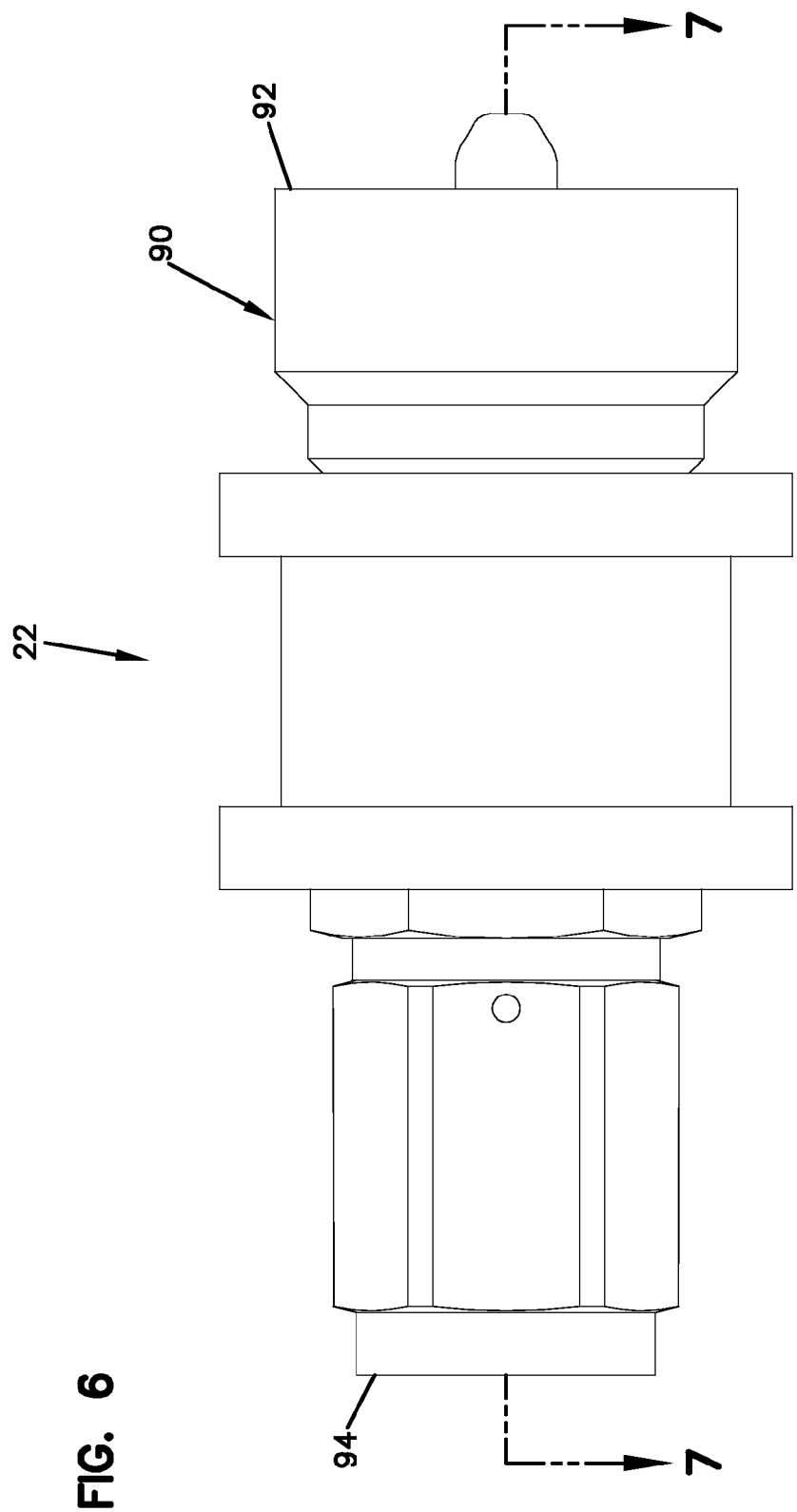
FIG. 6 is a side view of a coupler socket of the fluid coupling of FIG. 1.
Figure 7:
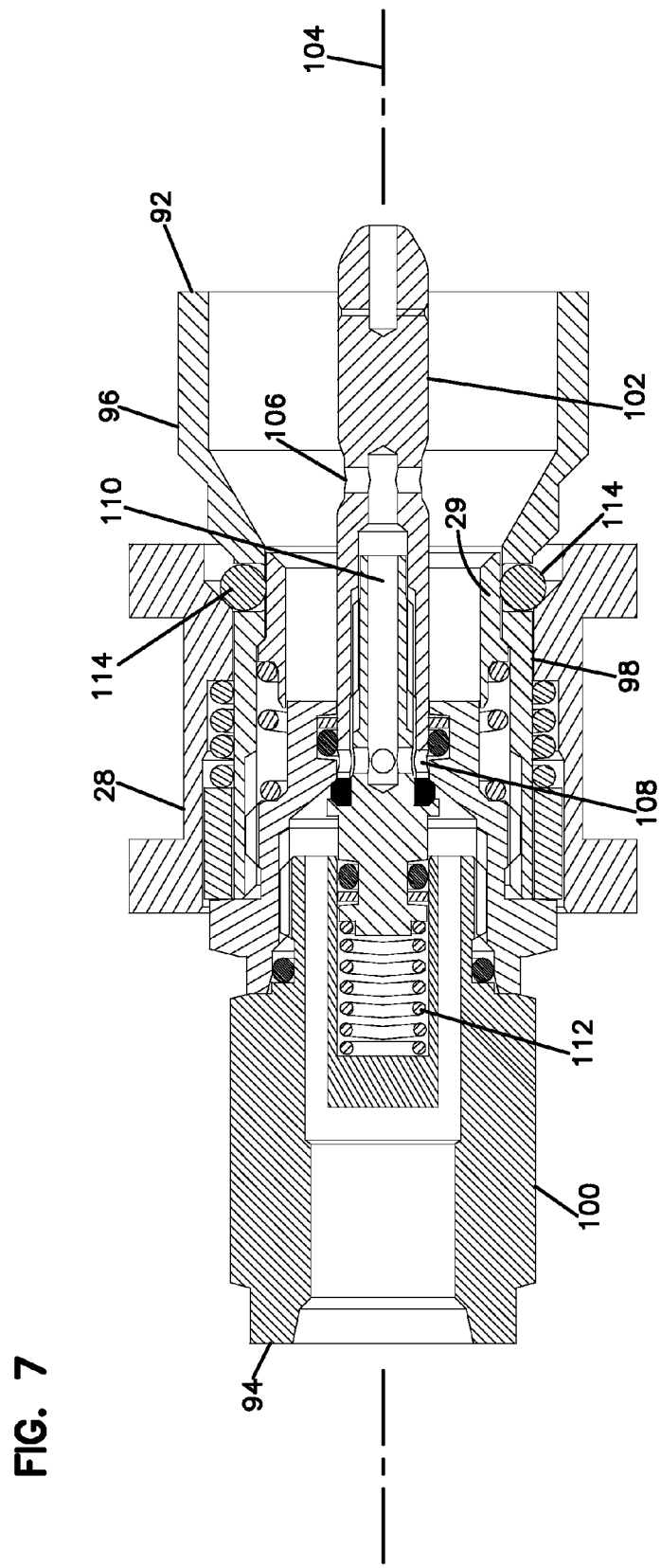
FIG. 7 is a cross-sectional view taken along Section Line 7-7 of FIG. 6.

FIGS. 6 and 7 show the coupler socket 22 of the quick connect coupling 20. The coupler socket 22 includes a socket housing 90 having a first end 92 positioned opposite from a second end 94. The first end 92 of the coupler socket 22 defines a plug receptacle for receiving the first end 32 of the coupler plug 24. The socket housing 90 is defined by a first housing piece 96, a second housing piece 98 and a third housing piece 100. The first housing piece 96 defines the first end 92 of the socket housing 90, the third housing piece 100 defines the second end 94 of the socket housing 90 and the second housing piece 98 mounts between the first and third housing pieces 96, 100.

The coupler socket 22 also includes a socket valve structure 102 aligned along a coupler socket axis 104 that extends through the coupler socket 22 between the first and second ends 92, 94 of the coupler socket 24. The socket valve structure 102 is elongated along the coupler socket axis 104 and extends into the plug receptacle defined at the first end 92 of the socket housing 90. The socket valve structure 102 includes first and second sets of radial socket valve openings 106, 108 that are spaced apart from one another along the coupler socket axis 104. The socket valve structure 102 also includes an internal socket valve passage 110 that extends through the socket valve structure 102 along the coupler socket axis 104 and that provides fluid communication between the first and second sets of radial socket valve openings 106, 108. The socket valve structure 102 is moveable relative to the socket housing 90 along the coupler socket axis 104 between an open position (see FIG. 2) and a closed position (see FIGS. 3 and 7). The socket valve structure 102 prevents fluid flow through the socket housing 90 when the socket valve structure 102 is in the closed position. The socket valve structure 102 allows fluid flow through the socket housing 90 via the first and second sets of radial socket valve openings 106, 108 and the internal socket valve passage 110 when the socket valve structure 102 is in the open position. A socket spring 112 biases the socket valve structure 102 toward the closed position and toward the first end of 92 of the socket housing 90. It will be appreciated that numerous annular seals are provided within the socket housing 90 sealing potential leak paths within the coupler socket 22.

As indicated above, the coupler socket 22 can include the retention mechanism 26 having the outer sleeve 28. The retention mechanism 26 also includes retention balls 114 positioned within openings defined by the second housing piece 98. The retention mechanism 26 also includes an inner sleeve 29. When the coupler socket 22 is in the decoupled orientation of FIG. 7, the retention balls 114 are captured between the inner and outer sleeves 28, 29 within the openings defined by the second housing piece 98. Springs bias both the inner and outer sleeves 28, 29 toward the first end 92 of the socket housing 90. When the coupler plug 24 is inserted into the coupler socket 22, the coupler plug 24 pushes the inner sleeve 29 inwardly against the bias of the corresponding spring to a position where the retention balls 114 can move radially inwardly into a retention grove 120 defined by the coupler plug 24. Concurrently, the outer sleeve moves by the force of its corresponding spring toward the first end 92 of the socket housing 90 thereby pushing the retention balls 114 radially inwardly toward their retention position. The outer sleeve 28 also functions to retain the retention balls 114 in the retention position as shown at FIG. 2.

When the coupler plug 24 is inserted into the plug receptacle of the upper socket 22, the coupler plug axis 48 aligns with the coupler socket axis 104. Additionally, the socket valve structure 102 slides within the plug valve passage 50 of the plug valve structure 26 until a tip of the socket valve structure 102 bottoms out within the plug valve structure 46. When the socket valve structure 102 bottoms out within the plug valve structure 46, the insertion force of the coupler plug 24 overcomes the bias of the socket spring 112 causing the socket valve structure 102 to be forced to the open position. Upon reaching the open position, the socket valve structure 102 bottoms out on a portion of the third housing piece 100 causing the plug insertion force to be transferred through the socket valve structure 102 to the plug valve structure 46. As this force is applied to the plug valve structure 46, the bias of the plug spring 70 is overcome causing the plug valve structure 46 to move to the open position. With both the socket valve structure 102 and the plug valve structure 46 in the open position, the radial plug valve openings 68 are placed in fluid communication with the first set of radial socket valve openings 106 such that fluid flow is allowed through the quick connect coupling between the coupler plug 24 and the coupler socket 22.

Figure 13:
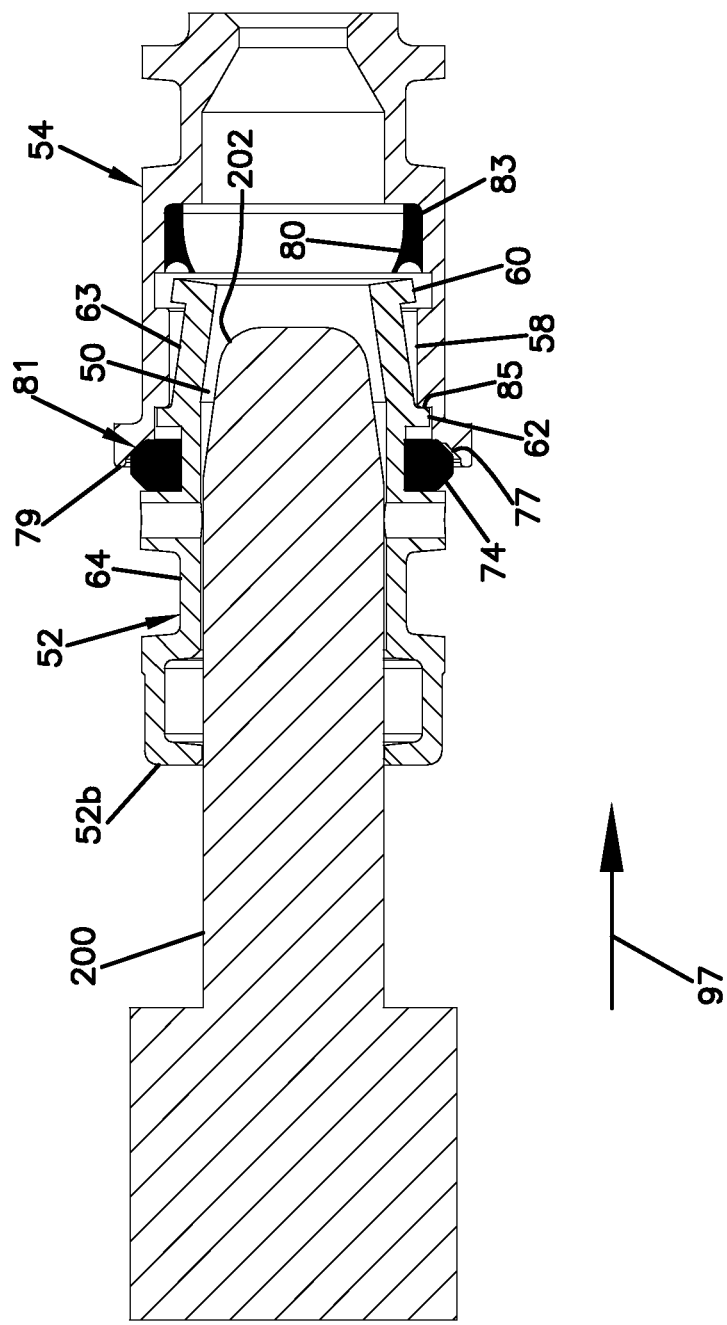
FIG. 13 is a cross-sectional view taken along Section Line 13-13 of FIG. 12.

In a preferred embodiment, the mechanical interface 56 between the first and second valve pieces 52, 54 is a swaged interface. As defined herein, a swaged interface is an interface formed by a process where dimensions of an item are changed by using a mechanical tool (e.g., a dye, a mandrel, or other type of forming, shaping or forging tool) to deform a portion of the item beyond its elastic limits. In certain embodiments, the swaging process can be undertaken by using a mandrel to deform a portion of an item radially outwardly beyond its elastic limits from an insertion configuration to a locking/retention configuration. In other embodiments, a die or compression sleeve can be used to deform a portion of an item beyond its elastic limits radially inwardly from an insertion configuration to a locking/retention configuration Another aspect of the present disclosure relates to a method for attaching together a male valve piece (e.g., the first valve piece 52) and a female valve piece (e.g., the second valve piece 54) to form a valve structure (e.g., valve structure 46) that extends along a longitudinal axis (e.g., axis 48). The method includes mounting a seal on at least one of the valve pieces. The method includes inserting the male and female valve pieces axially together (see FIG. 13). The valve pieces can include structure for compressing the seal when the valve pieces are slid axially together. A positive stop can be provided for stopping axial movement between the valve pieces when the seal is in adequately compressed and in a suitable sealing position. The method also includes using a swaging tool (e.g., a mandrel) to inelastically deform at least one of the male and female valve pieces from an insertion configuration to a locking configuration (see FIG. 14) in which relative axial movement between the male and female valve pieces is prevented. In the depicted embodiment, the male valve piece is deformed radially outwardly from the insertion configuration (i.e., a configuration where the male valve piece can be inserted into the female valve piece) to the locking configuration (i.e., a configuration where axial movement between the male and female valve pieces is prevented). The valve pieces are preferably locked precisely in a relative position where the seal is suitably compressed and in the proper location for sealing. Thus, the chance of leakage due to improper seal positioning or compression is reduced.

Figure 8:
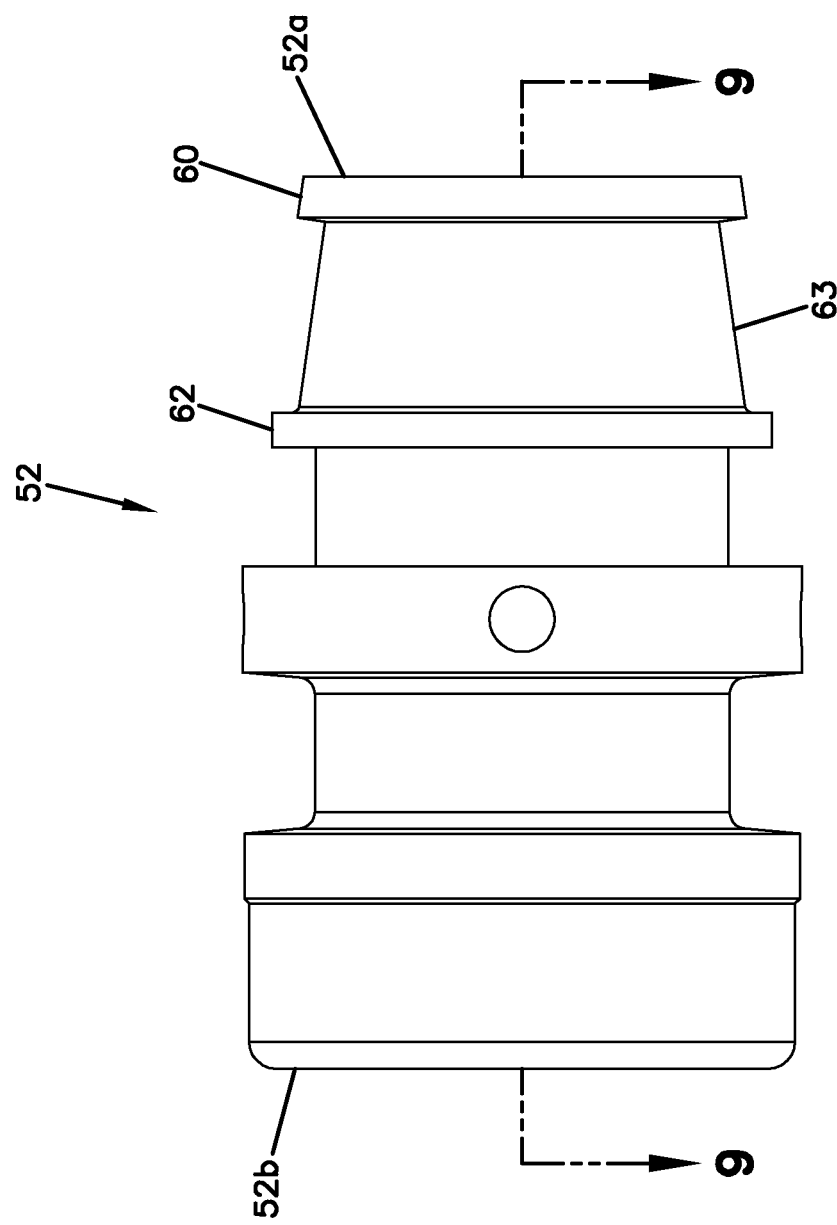
FIG. 8 is a side view of a first valve piece of a valve structure of the coupler plug of FIG. 5.
Figure 9:
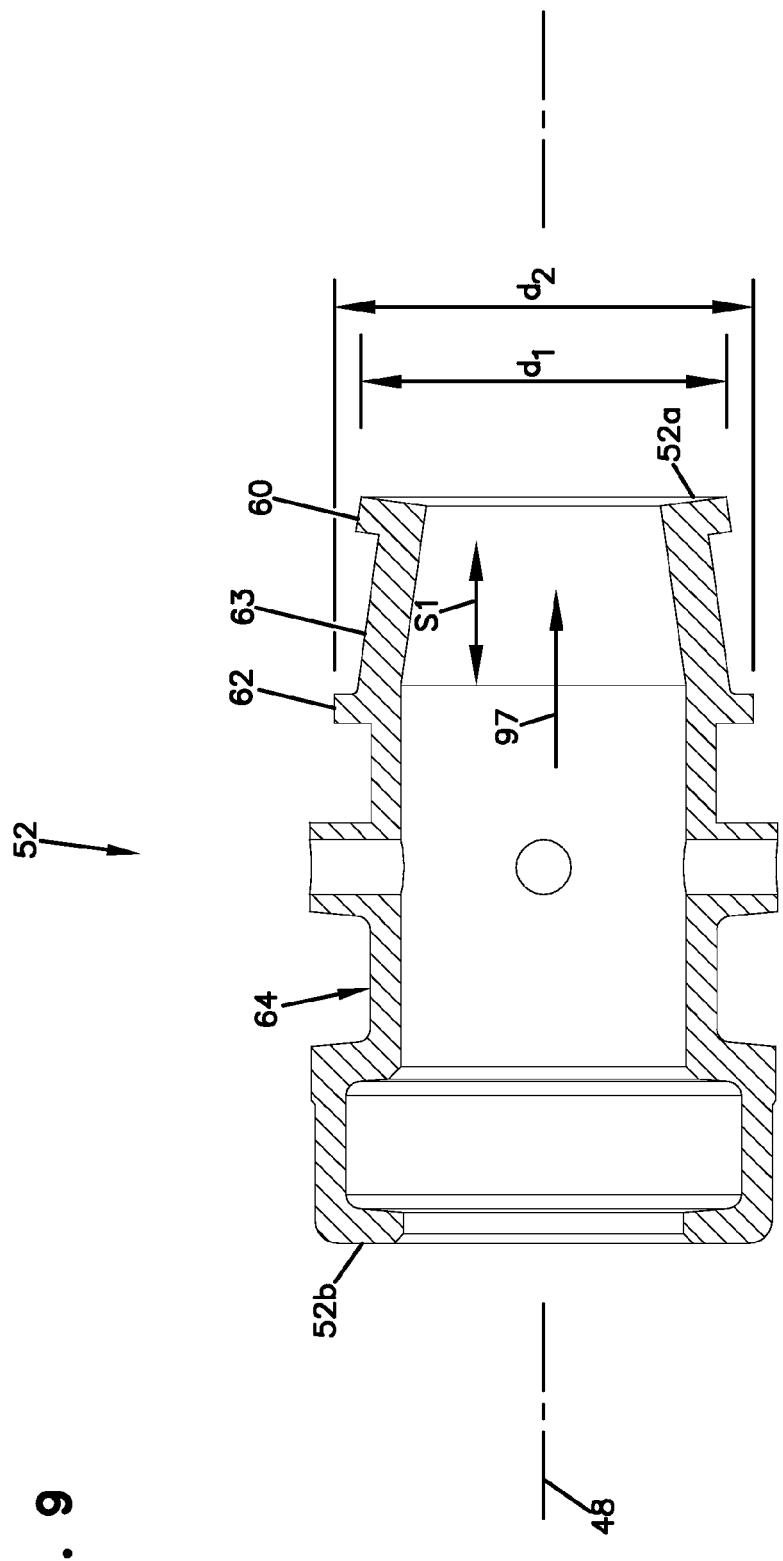
FIG. 9 is a cross-sectional view taken along Section Line 9-9 of FIG. 8.
Figure 10:
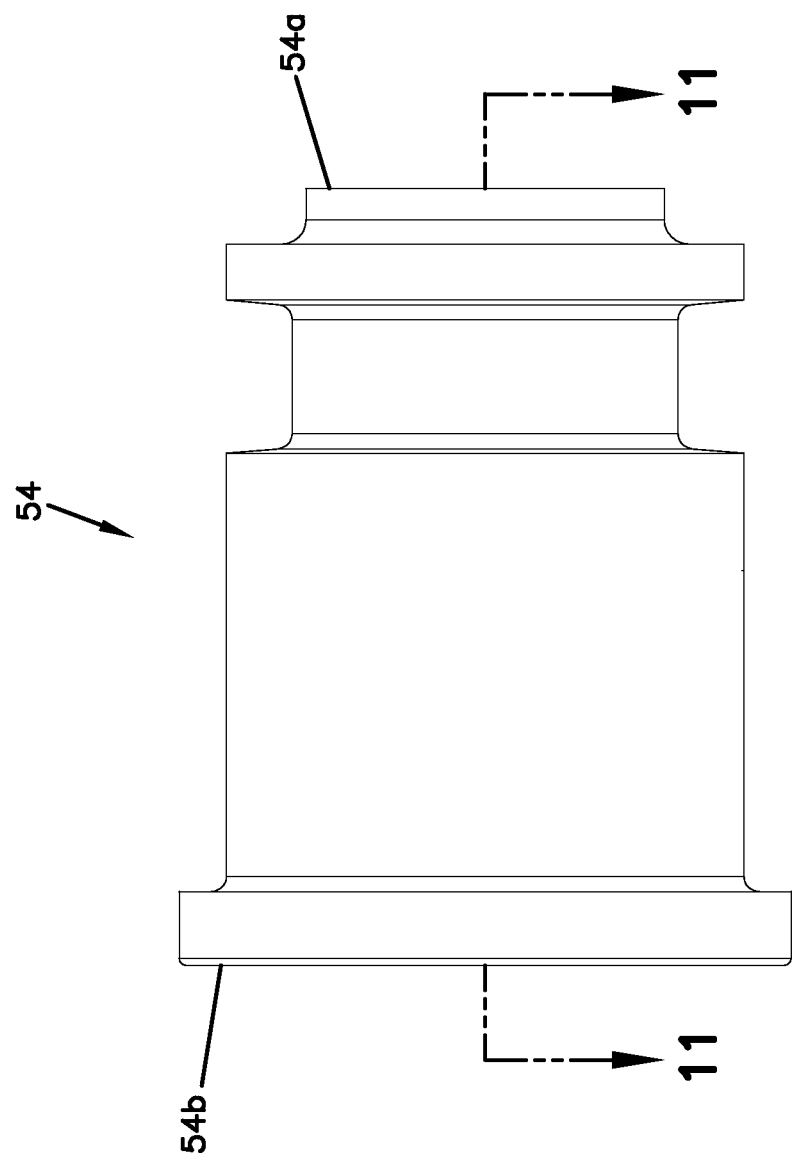
FIG. 10 is a side view of a second valve piece of the valve structure of the coupler plug of FIG. 5.
Figure 11:
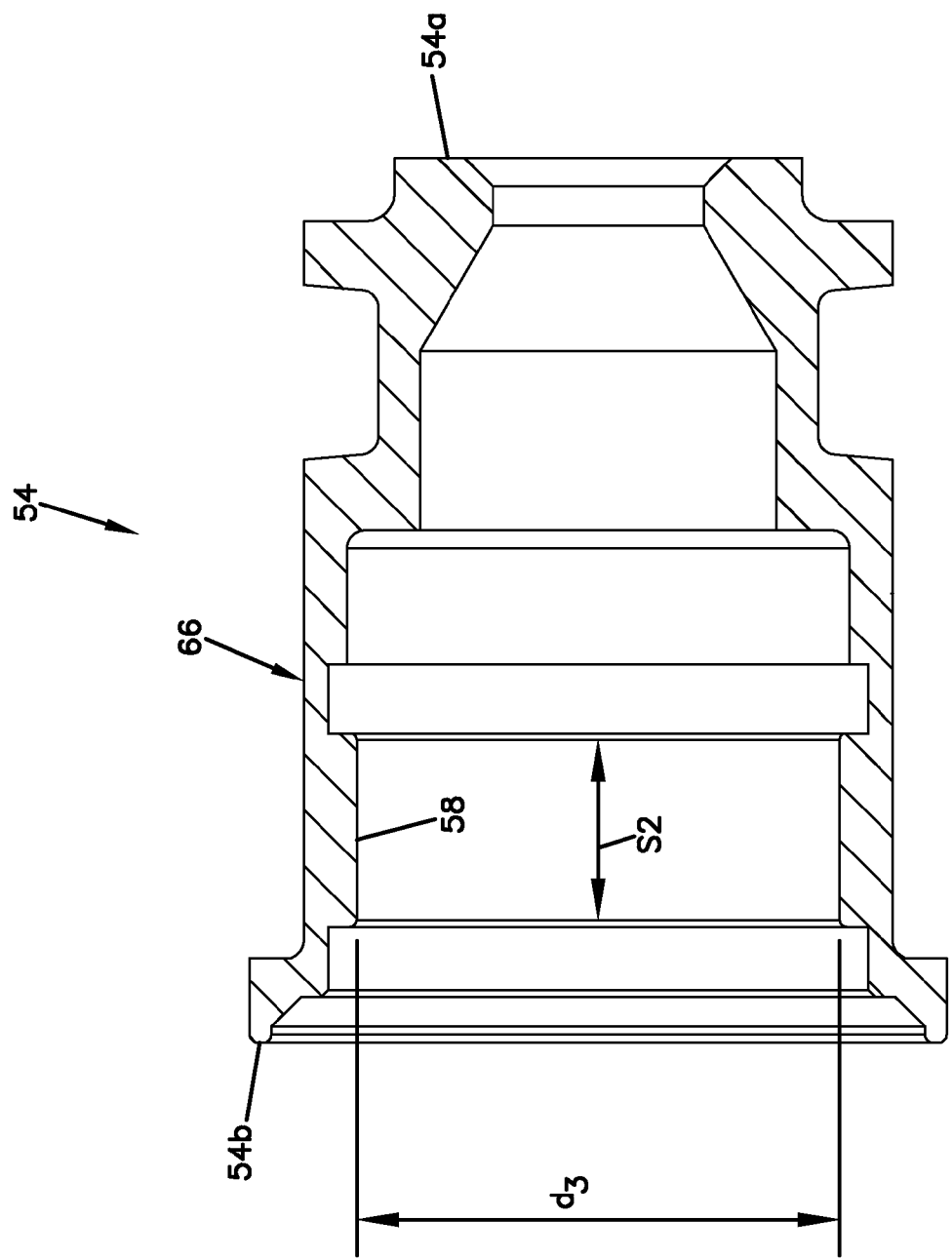
FIG. 11 is a cross-sectional view taken along Section Line 11-11 of FIG. 10.

FIGS. 8 and 9 show the first valve piece 52 prior to being coupled to the second valve piece 54. Thus, FIGS. 8 and 9 show the first valve piece 52 in the insertion configuration. The first valve piece 52 includes an insertion end 52a and a non-insertion end 52b. The first and second outward radial projections 60, 62 are positioned adjacent the insertion end 52a. The insertion end 52a has a tapered configuration. For example, the portion 63 of the main body 64 between the first outward radial projection 60 and the second outward radial projection 62 has a truncated, conical configuration that tapers radially inwardly towards the coupler plug axis 48 as the portion of the main body 64 extends in an insertion direction 97 from the second outward radial projection 62 to the first outward radial projection 60. In the pre-installed configuration of FIGS. 8 and 9, the first valve piece 52 is configured to be inserted into a receiving end 54b of the second valve piece 54 (shown at FIGS. 10 and 11). The second valve piece 54 also includes a non-receiving end 52a.

When the first valve piece is in the insertion configuration of FIGS. 8 and 9, the insertion end 52a includes the first and second outer retaining projections 60, 62 which are separated by the tapered portion 63 of the main body of the male valve piece. The tapered portion 63 tapers inwardly toward the longitudinal axis 48 as the tapered portion 63 extends in the insertion direction 97 from the second outer retaining projection 62 toward the first outer retaining projection 60. The first outer retaining projection 60 has a smaller outer diameter d1 than an outer diameter d2 the second outer retaining projection 62. The outer diameter d1 of the first outer retaining projection 60 is smaller than an inner diameter d3 of the interior retaining projection 58 and the outer diameter d2 of the second outer retaining projection 62 is larger than the inner diameter d3 of the interior retaining projection 58. An axial spacing s1 between the first and second outer retaining projections 60, 62 is generally equal to an axial dimension s2 of the interior retaining projection 58 at least when the first valve piece 52 is deformed to the locking configuration.

Figure 12:
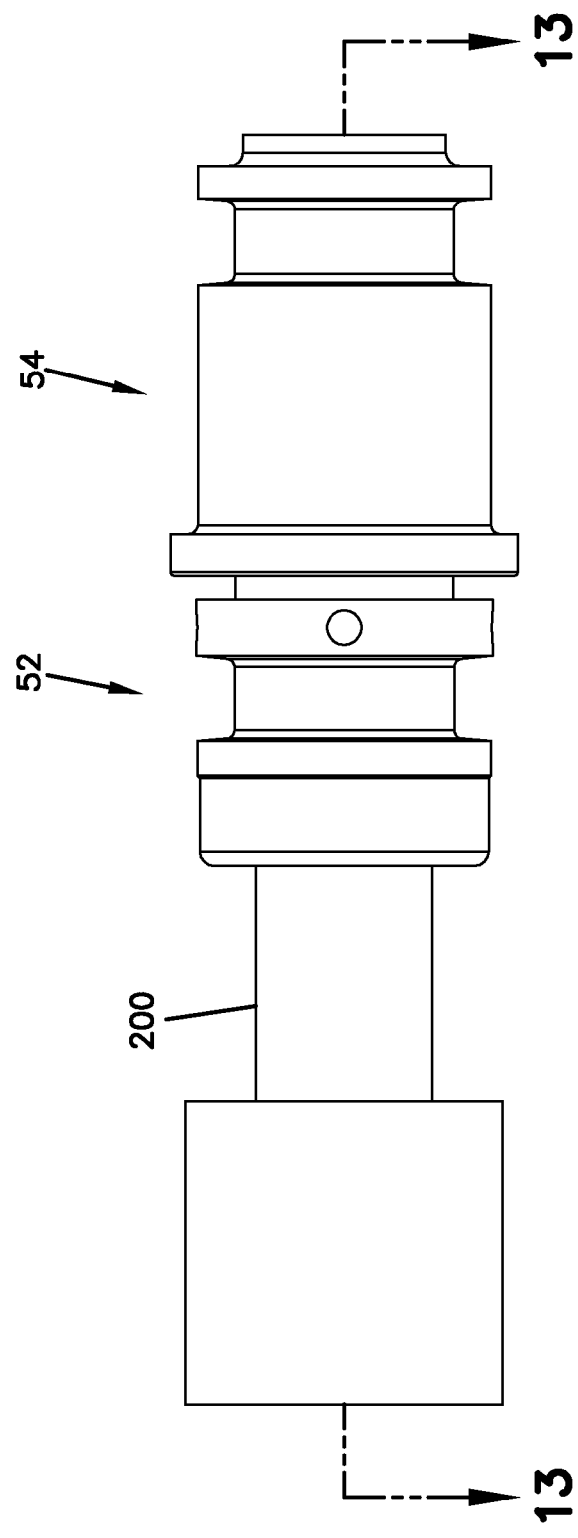
FIG. 12 is a side view showing an assembly process in which the first valve piece of FIGS. 8 and 9 is inserted within the second valve piece of FIGS. 10 and 11, and a mandrel is inserted within the first valve piece.
Figure 14:
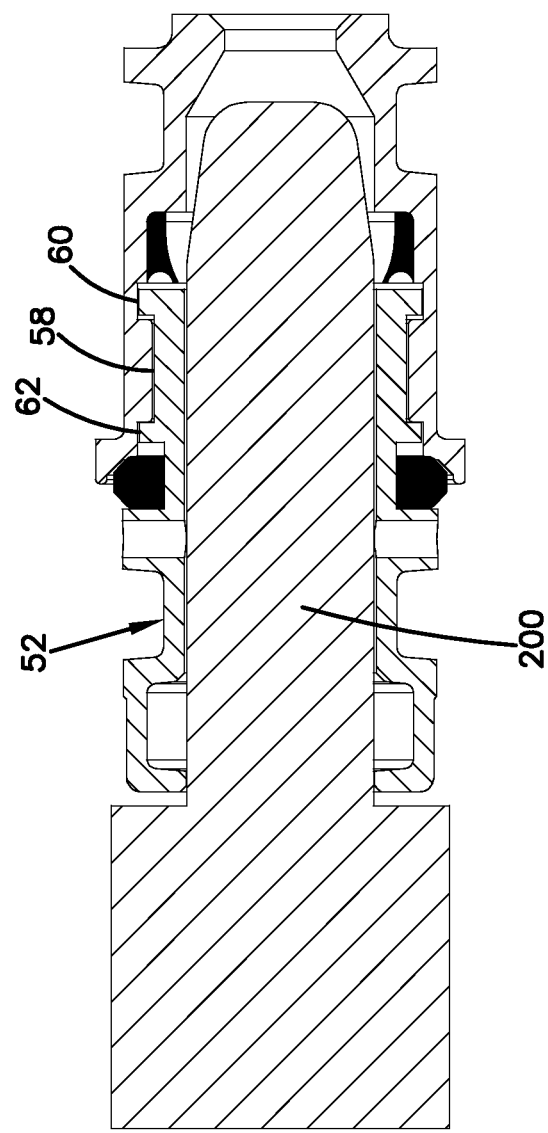
FIG. 14 shows the mandrel of FIG. 13 fully inserted through the first valve piece such that a portion of the first valve piece has been swaged permanently outwardly to a locking position in which the first and second valve pieces are locked together.

To assemble the first valve piece 52 within the second valve piece 54, the seal 74 is mounted in the groove 75 of the first valve piece 52 and the seal 80 is mounted within an inner pocket 83 of the second valve piece 54. The inner bore of the second valve piecet 54 is unthreaded. Thus, threads do not interfere with inserting the seal 80 into the inner pocket 83. Once the seals 74, 80 are in place, the insertion end 52a of the first valve piece 52 is inserted into the receiving end 54b of the second valve piece 54 until the second outward radial projection 62 of the first valve piece 52 abuts against the inward radial projection 58 of the second valve piece 54. (See FIGS. 12 and 13). A shoulder 85 of the projection 58 serves as a positive stop against which the radial projection 62 abuts to arrest axial movement between the first and second valve pieces 52, 54 at a sealing position where the seal 74 is compressed against the ramp surface 74 and contained within the pocket 81. A cylindrical mandrel 200 having a tapered nose 202 is then inserted into the first valve piece 52 through the non-insertion end 52b and used to deform the insertion end 52a of the first valve piece 52 using a swaging process. During the swaging process, the mandrel 200 can be rotated about its central longitudinal axis. Movement of the mandrel 200 into the first valve piece 52 causes the tapered nose of 202 of the mandrel 200 to engage the tapered portion 63 of the main body 64 causing the main body to be forced radially outwardly as shown at FIG. 14. Specifically, the insertion end of the first valve piece 52 is deformed radially outwardly beyond its elastic limits. The deformation can include an outward expansion of the tapered portion 63 of the main body 64. The insertion end of the first valve piece 52 inelastically deformed radially outwardly via swaging action until the inward radial projection 58 is captured between the first outward radial projection 60 and the second outward radial projection 62 as shown at FIG. 14. Thus, the swaging action causes the second outward radial projection 62 to move from an insertion position (see FIG. 13) radially outwardly to a retaining/locking position in which the inward radial projection 58 is captured between the first and second outward radial projection 60, 62 thereby preventing relative axial movement between the first and second valve pieces 52, 54 and permanently connecting the first and second valve pieces 52, 54 together. Thus, via the swaging action, the first and second valve pieces are locked together and retained the relative axial position in which the seal 74 is adequate compressed and properly located for sealing. After the swaging process has been completed, the mandrel 200 can be removed from the plug valve structure 46 and the remainder of the coupler plug 24 can be assembled.

Figure 15:
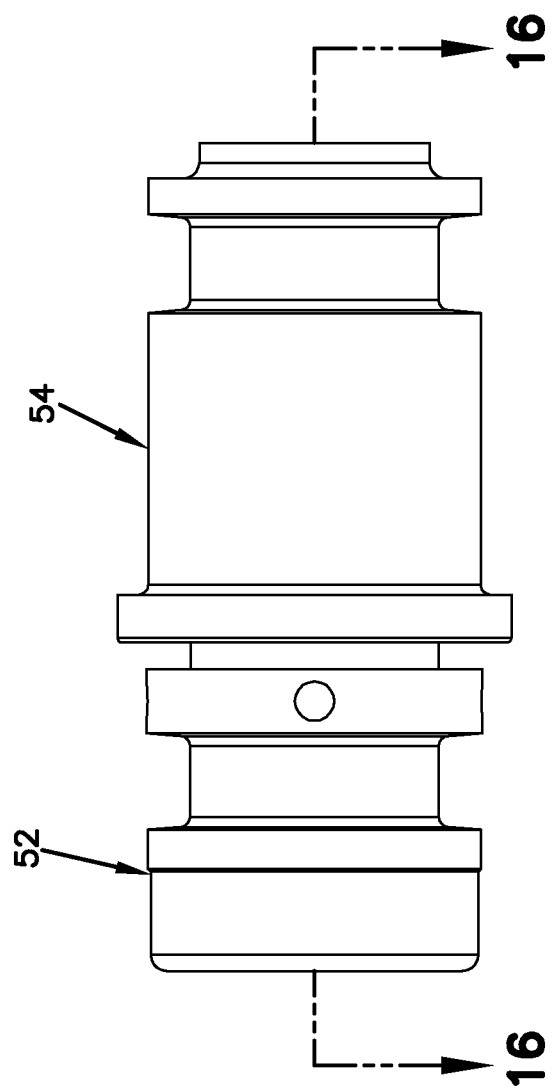
FIG. 15 is a side view of the first and second valve pieces after the valve pieces have been locked together to form the valve structure of the male coupling of FIG. 5.
Figure 16:
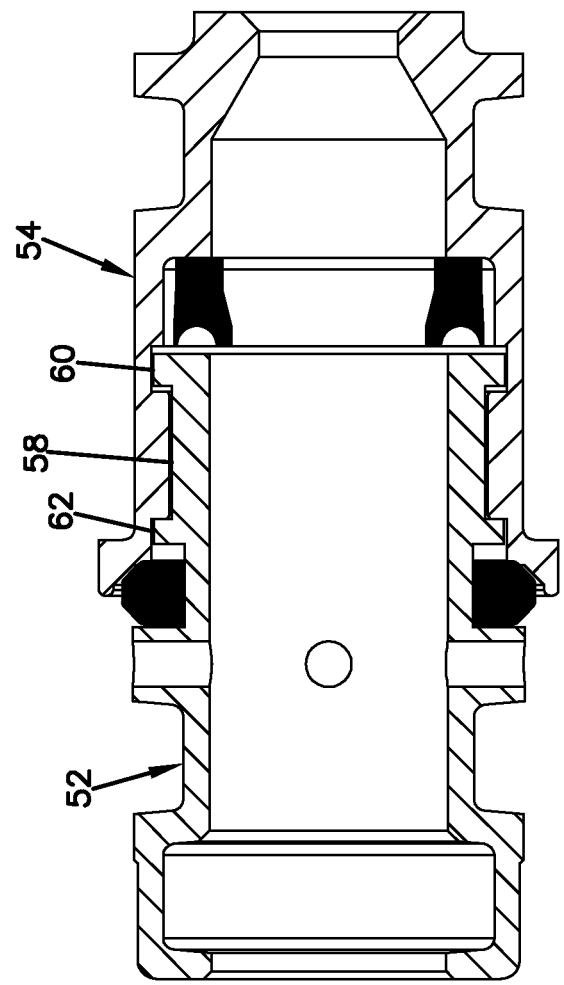
FIG. 16 is a cross-sectional view taken along Section Line 16-16 of FIG. 15.

The mandrel causes the tapered portion of the main body 64 to be re-shaped and expanded radially outwardly via a swaging action until the first valve piece 52 reaches the locking/retaining configuration of FIG. 14. The swaging action causes portions of the first valve piece 52 to deform beyond its elastic limits (i.e., the part inelastically deforms). In the locking configuration, the interior projection 58 is captured between the outward radial projections 60, 62. After expansion of the insertion end of the first valve piece 52, the outer diameter of the first outer retaining projection 60 is larger than the inner diameter d3 of the interior retaining projection 58. FIGS. 15 and 16 show the assembled plug valve structure 46 with the mandrel 200 removed.

FIGS. 17 and 18 show an alternative swaging process for fastening first and second valve pieces 152, 154 together. Valve piece 152 includes an insertion end 152a that includes an inner projection such as an inner ring 156 prior to being coupled to the second valve piece 154. The inner ring 156 has an angled surface and a generally triangular cross-sectional shape. Similar to the previously described embodiment, a mandrel can be used to inelastically deform and shape portions of the first valve piece 152 so as to couple the first and second valve pieces 152, 154 together. Specifically, as shown in FIG. 18, as the mandrel 200 presses against the inner ring 156, the insertion end of the first valve piece 152 is deformed radially outwardly to form an outward radial projection 162 (e.g., a retention ring) that opposes a corresponding inward radial projection 158 (e.g., a retention ring) of the second valve piece 154. The inward radial projection 158 is captured between the first outward radial projection 160 and a second outward radial projection 162 (e.g., a retention ring) to lock the first and second valve pieces 152, 154 together. The first outward radial projection 160 engages the inward radial projection 158 at interface angle relative to a central longitudinal axis 148 of the plug valve structure. In contrast, in the previous embodiment, the first and second outward radial projection 60, 62 engage the inward radial projection 58 at interface surfaces that are generally perpendicular relative to the central longitudinal axis of the plug valve structure 46.

From the forgoing detailed description, it will be evident that modifications and variations can be made without departing from the spirit and scope of the disclosure.

The invention claimed is:

1. A method for attaching together a male valve piece and a female valve piece to form a valve structure that extends along a longitudinal axis, the method comprising:
    inserting the male and female valve pieces axially together; and
    using a swaging tool to inelastically deform at least one of the male and female valve pieces from an insertion configuration to a locking configuration in which relative axial movement between the male and female valve pieces is prevented;
    wherein the female valve piece includes an interior retaining projection that projects radially inwardly from a main body of the female valve piece, wherein the male valve piece includes an insertion end including first and second outer retaining projections that project radially outwardly from a main body of the male valve piece at least when the male valve piece is in the locking configuration, wherein the interior retaining projection is captured between and abuts the first and second outer retaining projections that provide a rigid connection when the male valve piece is in the locking configuration.

2. The method of claim 1, wherein a seal is provided on one of the male and female valve pieces, wherein a positive stop is provided that stops axial movement between the male and female valve pieces at a desired relative position where the seal is properly compressed and located at a suitable sealing position, and wherein the male and female valve pieces are locked in the desired relative position when the swaging tool inelastically deforms at least one of the male and female valve pieces from the insertion configuration to the locking configuration.

3. The method of claim 1, wherein the first and second outer retaining projections have the same height.

4. The method of claim 1, wherein the male valve piece is inelastically deformed by the swaging tool, wherein the swaging tool comprises a mandrel that is inserted at least partially through the male valve piece to deform the male valve piece from the insertion configuration to the locking configuration.

5. The method of claim 4, wherein the first and second outer retaining projections are ring-shaped and extend around the longitudinal axis, and wherein the interior retaining projection is ring shaped and extends around the longitudinal axis.

6. The method of claim 5, wherein when the male valve piece is in the insertion configuration the insertion end includes the second outer retaining projection and an inner projection which are separated by a portion of the main body of the male valve piece that extends in an insertion direction of the male valve piece from the second outer retaining projection to the inner projection, and wherein to deform the male valve piece from the insertion configuration to the locking configuration the mandrel engages the inner projection causing the male valve piece to deform radially outwardly to the locking configuration in which the interior retaining projection of the female valve piece is captured between the first and second outer radial projections of the male valve piece.

7. The method of claim 5, wherein when the male valve piece is in the insertion configuration: a) the insertion end includes the first and second outer retaining projections which are separated by a tapered portion of the main body of the male valve piece; b) the tapered portion tapers inwardly toward the longitudinal axis as the tapered portion extends in an insertion direction from the second outer retaining projection toward the first outer retaining projection; c) the first outer retaining projection has a smaller outer diameter than the second outer retaining projection; and d) an outer diameter of the first outer retaining projection is smaller than an inner diameter of the interior retaining projection and an outer diameter of the second outer retaining projection is larger than the inner diameter of the interior retaining projection.

8. The method of claim 7, wherein the mandrel inelastically expands the tapered portion radially outwardly to deform the male valve piece from the insertion configuration to the locking configuration, and wherein the outer diameter of the first outer retaining projection is larger than the inner diameter of the interior retaining projection when the male valve piece is in the locking configuration.

9. The method of claim 8, wherein an axial spacing between the first and second outer retaining projections is generally equal to an axial dimension of the interior retaining projection at least when the male valve member is in the locking configuration.

10. A quick connect coupling component comprising:
    a component housing including a first end and an opposite second end;
    a valve structure aligned along an axis that extends through the component housing between the first and second ends of the component housing, the valve structure being elongated along the axis, the valve structure having a hollow interior so as to define a valve passage that extends through the valve structure along the axis, the valve structure including a first valve piece secured within a second valve piece by a non-threaded mechanical connection interface, the first and second valve pieces being metal, the non-threaded mechanical interface being provided by an inward radial projection of the second valve piece that is captured between and abuts first and second outward radial projections of the first valve piece that provide a rigid connection such that relative movement between the first and second valve pieces along the axis is prevented, the first and second outward radial projections being unitary with a main body of the first valve piece and forming exterior rings of the first valve piece that extend around the axis, the inward radial projection being unitary with a main body of the second valve piece and forming an interior ring of the second valve piece that extends around the axis, the valve structure being movable relative to the component housing along the axis between open and closed positions, the valve structure preventing fluid flow through the component housing when the valve structure is in the closed position, and the valve structure allowing fluid flow through the component housing when the plug valve structure is in the open position; and a spring that biases the valve structure toward the closed position.

11. The quick coupling component of claim 10, wherein the non-threaded mechanical interface is a swaged interface.

12. The quick coupling component of claim 10, wherein the exterior rings of the first valve piece and the interior ring of the second valve piece are continuous rings.

13. The quick coupling component of claim 10, wherein the exterior rings of the first valve piece and the interior ring of the second valve piece have rectangular cross-sectional shapes when viewed in cross-section with the cross-section being cut along a cross-sectional plane that includes the axis.

14. The quick connect coupling component of claim 10, wherein the inward radial projection includes a shoulder that serves as a positive stop against which the second outward radial projection abuts to arrest axial movement between the first and second valve pieces at a sealing position, and wherein a seal is compressed against a ramp surface defined by the second valve piece and is continued within a pocket.

15. The quick connect coupling component of claim 10, wherein the first and second outer retaining projections have the same height.

16. The quick connect coupling component of claim 10, wherein the quick connect coupling is part of a high pressure breathing air coupling.

17. The quick coupling component of claim 16, wherein the non-threaded mechanical interface prevents an air leak path between the first and second valve pieces.

18. A quick connect coupling comprising:
a) a coupler socket including:
a socket housing having a first end and an opposite second end, the first end of the coupler socket defining a plug receptacle;
a socket valve structure aligned along a coupler socket axis that extends through the coupler socket between the first and second ends of the coupler socket, the socket valve structure being elongated along the coupler socket axis and extending into the plug receptacle, the socket valve structure including first and second sets of radial socket valve openings that are spaced apart from one another along the coupler socket axis, the socket valve structure also including an internal socket valve passage that extends through the socket valve structure along the coupler socket axis and that provides fluid communication between the first and second sets of radial socket valve openings, the socket valve structure being movable relative to the socket housing along the coupler socket axis between open and closed positions, the socket valve structure preventing fluid flow through the socket housing when the socket valve structure is in the closed position, and the socket valve structure allowing fluid flow through the socket housing via the first and second sets of radial socket valve openings and the internal socket valve passage when the socket valve structure is in the open position;
a socket spring that biases the socket valve structure toward the closed position and toward the first end of the coupler socket;
a plug retention mechanism carried with the socket housing;
b) a coupler plug configured to be releasably retained within the plug receptacle of the socket housing by the plug retention mechanism, the coupler plug including:
a plug housing including a first end and an opposite second end, the first end of the plug housing defining a male plug portion configured to be received within the plug receptacle of the coupler socket;
a plug valve structure aligned along a coupler plug axis that extends through the coupler plug between the first and second ends of the plug housing, the plug valve structure being elongated along the coupler plug axis, the plug valve structure having a hollow interior so as to define a plug valve passage that extends through the plug valve structure along the coupler plug axis, the plug valve structure including a first valve piece secured within a second valve piece by a non-threaded mechanical connection interface, the first and second valve pieces being metal, the non-threaded mechanical interface being provided by an inward radial projection of the second valve piece that is captured between and abuts first and second outward radial projections of the first valve piece that provide a rigid connection such that relative movement between the first and second valve pieces along the coupler plug axis is prevented, the first and second outward radial projections being unitary with a main body of the first valve piece and forming exterior rings of the first valve piece that extend around the coupler plug axis, the inward radial projection being unitary with a main body of the second valve piece and forming an interior ring of the second valve piece that extends around the coupler plug axis, the first valve piece defining a plurality of radial plug valve openings that extend through the main body of the first valve piece and provide fluid communication between the plug valve passage and an exterior of the plug valve structure, the plug valve structure being movable relative to the plug housing along the coupler plug axis between open and closed positions, the plug valve structure preventing fluid flow through the plug housing when the plug valve structure is in the closed position, and the plug valve structure allowing fluid flow through the plug housing via the radial plug valve openings and the plug valve passage when the plug valve structure is in the open position;

a plug spring that biases the plug valve structure toward the closed position and toward the first end of the plug housing; and c) wherein when the coupler plug is inserted into the plug receptacle of the coupler socket, the coupler plug axis aligns with the coupler socket axis, the plug valve structure and the socket valve structure move to the open positions, and the radial plug valve openings are placed in fluid communication with the first set of radial socket valve openings such that fluid flow is allowed through the quick connect coupling between the coupler plug and the coupler socket.

19. The quick connect coupling of claim 18, wherein the non-threaded mechanical interface is a swaged interface.

20. The quick connect coupling of claim 18, wherein the exterior rings of the first valve piece and the interior ring of the second valve piece are continuous rings.

21. The quick connect coupling of claim 18, wherein the exterior rings of the first valve piece and the interior ring of the second valve piece have rectangular cross-sectional shapes when viewed in cross-section with the cross-section being cut along a cross-sectional plane that includes the coupler plug axis and the coupler socket axis.

22. The quick connect coupling of claim 18, wherein the first and second outer retaining projections have the same height.

23. The quick connect coupling of claim 18, wherein the quick connect coupling is a high pressure breathing air coupling.

24. The quick connect coupling of claim 23, wherein the non-threaded mechanical interface prevents an air leak path between the first and second valve pieces.

* * * * *